Oct. 22, 1935.     F. F. ADAMS     2,018,590
CURRENT SHUT-OFF MECHANISM
Filed Jan. 3, 1934     3 Sheets-Sheet 1

Inventor
F. F. Adams
Geo. P. Kimmel
Attorney

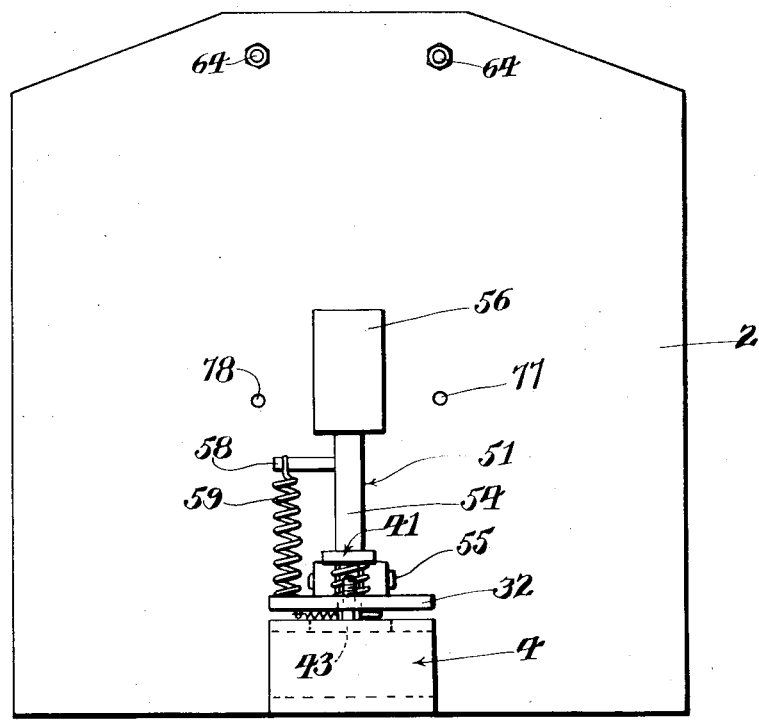
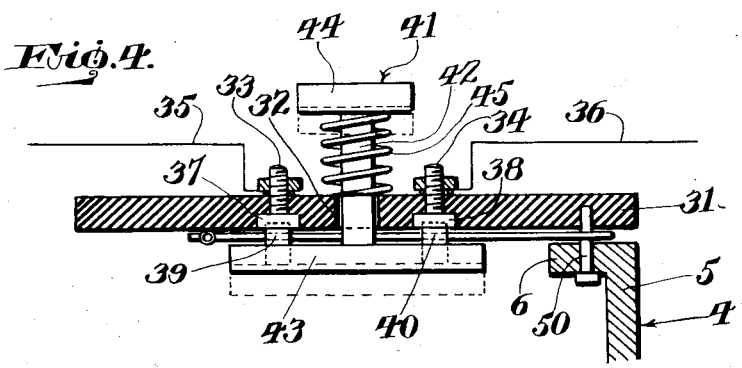

Oct. 22, 1935.   F. F. ADAMS   2,018,590
CURRENT SHUT-OFF MECHANISM
Filed Jan. 3, 1934   3 Sheets-Sheet 3

Inventor
F. F. Adams

By Geo. F. Kimmel
Attorney

Patented Oct. 22, 1935

2,018,590

UNITED STATES PATENT OFFICE 2,018,590

CURRENT SHUT-OFF MECHANISM

Frank F. Adams, El Dorado, Kans.

Application January 3, 1934, Serial No. 705,151

10 Claims. (Cl. 200—52)

This invention relates to a current shut-off mechanism designed primarily for use in connection with automotive vehicles and aeroplanes of that type propelled from internal combustion motors, but it is to be understood that a mechanism, in accordance with this invention, may be employed in any connection for which it may be found applicable, and the invention has for its object to provide, in a manner as hereinafter set forth, a mechanism of the class referred to for automatically and instantly shutting off all current to the ignition and other circuits when the vehicle, in which the mechanism is installed, collides with an obstruction thereby discontinuing the operation of the vehicle's motor, preventing the igniting of the motor fuel and reducing to a minimum the possibility of a conflagration.

A further object of the invention resides in the providing of a current shut-off mechanism in a manner as hereinafter set forth, for instantly shutting off of all current for the purpose referred to, when the vehicle, in which the mechanism is installed, overturns from each side thereof.

Further objects of the invention are to provide a mechanism of the class referred to for the purpose set forth, which is comparatively simple in its construction and arrangement, strong, durable, compact, thoroughly efficient in its use, automatic and expeditious in its action to open the ignition system of an internal combustion engine, readily installed with respect to the vehicle with which it is to be used, and comparatively inexpensive to manufacture.

To the above ends essentially and to others which may hereinafter appear, the invention consists of such parts, and such combination of parts which fall within the scope of the invention as claimed.

In the drawings:

Figures 2 and 3 are respectively a rear and a front elevation thereof.

Figure 4 is a sectional view of the form of switch employed.

Figure 1:
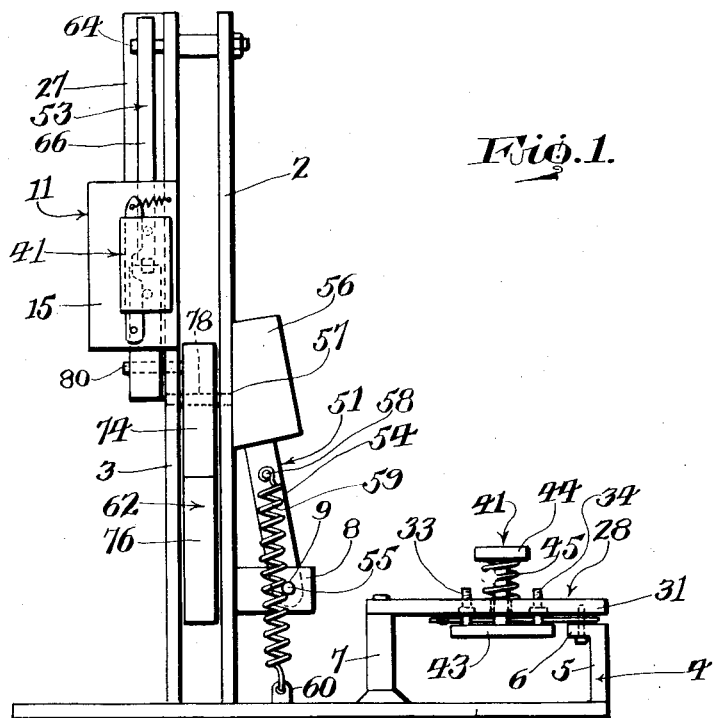
Figure 1 is a side elevation of that form of the mechanism for use in connection with an automotive vehicle, such as an automobile or motor driven truck.
Figure 2:
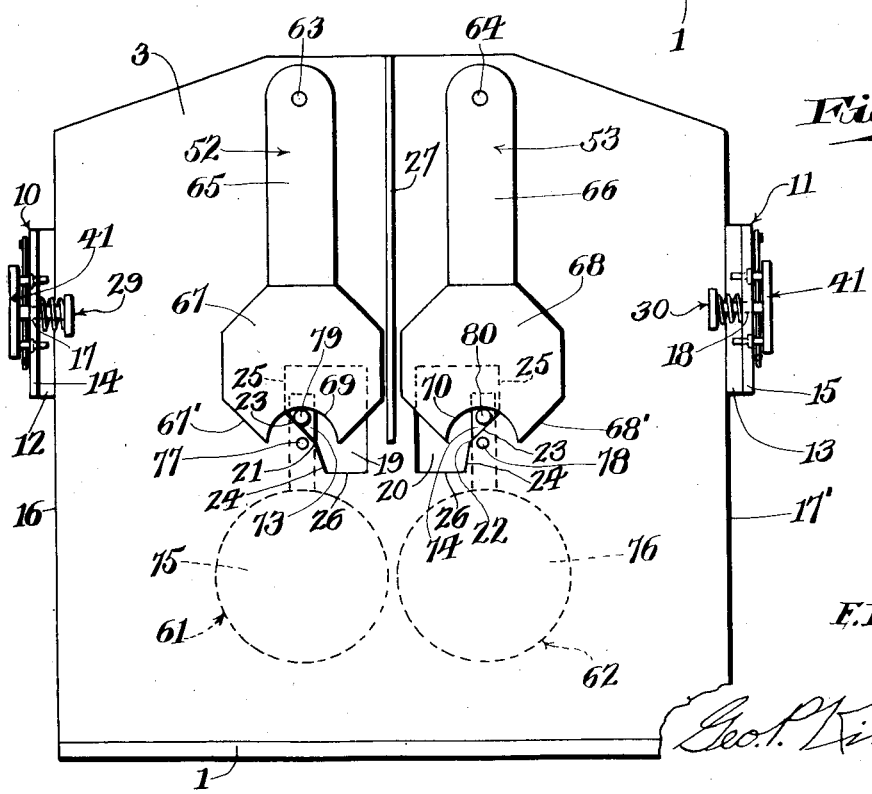
Figure 5:
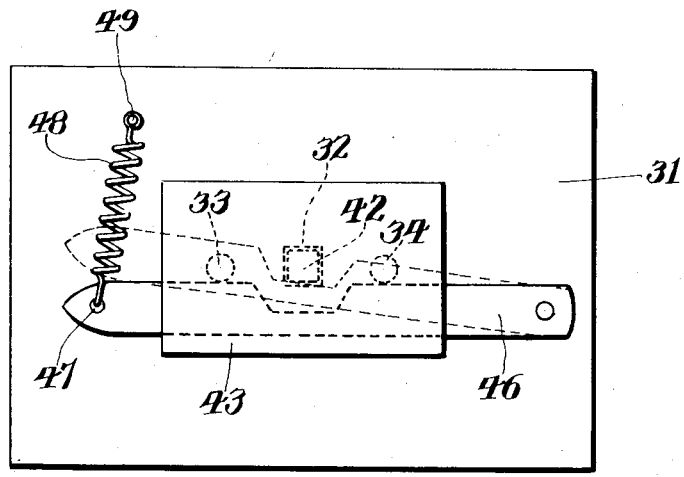
Figure 5 is a bottom plan view of a switch.

Referring to Figures 1 to 5 of the drawings, the current shut-off mechanism as illustrated thereby includes a base plate 1 having extended upwardly therefrom and fixedly secured therewith a pair of spaced parallel vertically disposed front and rear supporting plates 2, 3 respectively. The forward end of base 1 is formed with an angle-shaped support 4 having a vertical leg 5 terminating at its upper end into an inwardly extending leg 6 disposed at right angles to leg 5. Anchored to the base 1 is a post 7 which is spaced from and is of the same height as support 4. The purpose of the latter and post 7 will be presently referred to.

The plates 2, 3 are of like contour and of the same width and height. The plate 2 in proximity to its lower end is formed with a pair of spaced forwardly extending parallel short apertured lugs 8. The apertures in the latter are indicated at 9, are disposed in alignment and positioned between the vertical medians and forward ends of said lugs. The lugs 8 are arranged in proximity to opposite sides of the vertical median of plate 2. The plate 3, at a point between its transverse median and its upper end, is formed with a pair of oppositely disposed spaced parallel vertically extending supporting members 10, 11 of angle-shaped contour in transverse cross section. The members 10, 11 consist of inner legs 12, 13 respectively and outer legs 14, 15 respectively. The legs 12, 13 form flush continuations of the sides 16, 17' respectively of plate 3. The legs 14, 15 are integral with the outer sides of legs 12, 13 respectively and extend rearwardly at right angles to the latter. The widths of legs 14, 15 are greater than that of the legs 12, 13 respectively. The members 10, 11 are of non-conducting material. The legs 14, 15 of members 10, 11 have central openings 17, 18 respectively. The plate 3 adjacent the sides of its vertical median is formed with a pair of openings 19, 20 having outer lower corner walls 21, 22 respectively. Each corner wall is formed of a pair of oppositely inclined parts 23, 24 merging into each other and one merging into the lower end of the outer side wall 25 of an opening and the other merging into the outer end of the bottom wall 26 of an opening. The openings 19, 20 have their upper parts arranged in alignment with the lower end portions of the members 10, 11. The corner walls 21, 22 are oppositely disposed with respect to each other. The function of the openings and the corner walls 21, 22 will be hereinafter referred to. The rear face of plate 3, at the vertical median of the latter is formed with a rearwardly extending vertical stop 27 for a purpose to be referred to.

The mechanism as shown by Figures 1 to 5 includes three switches which are selectively operated for the purpose of shutting off the current to the ignition and other circuits of the vehicle. Each switch is interposed in the current supply circuit at the desired point. Each switch is of like form. The switches are generally designated 28, 29 and 30. Each switch includes a nonconducting apertured base member. The base member of the switch 28 is provided by an apertured plate 31 of insulating material which is secured to the leg 6 and post 7. The base member of the switch 29 is provided by the leg 14 of member 10, and the base member of switch 30 by the leg 15 of member 11. The base member 31 of switch 28 is illustrated in Figures 1, 3, 4 and 5 and the opening therein at 32.

Each switch includes a pair of binding posts 33, 34 to which circuit connections 35, 36 are attached. The posts 33, 34 are of the headed type and are secured to a base member in a manner whereby the heads 37, 38 thereof are flush with one face of a base member, see Figure 4. The heads 37, 38 are disposed in a manner to be engaged by a pair of spaced contacts 39, 40 carried by a spring controlled bridging element 41 consisting of a stem 42, a bridge piece 43 at one end of the stem and an abutment piece 44 at the other end of the stem. The bridge piece 43 is of greater width and length than the abutment piece 44 and carries the contacts 39, 40. Interposed between the abutment piece 44 and a base member and surrounding the stem 42 is a coiled spring 45 normally tending to maintain the contacts 39, 40 in electrical engagement with the heads 37, 38 for closing the current carrying circuit. Arranged against that face of a base member with which the heads 37, 38 are flush, that is to say interposed between bridge piece 43 and a base member, is a pivoted spring controlled lockout lever 46 of non-conducting material. The lever 46 normally abuts the sides of the contacts 39, 40, but when bridge piece 43 is shifted in a direction from a base member, the lever interposes itself between the heads 37, 38 and contacts 39, 40, Figure 5, whereby the circuit is held open. The lever 46 has an opening 47 at one end for the purpose of attaching thereto one end of a controlling spring 48. The other end of the latter is connected to a base member as at 49. The lever 46 is cut out to provide a clearance 49' for the stem 42.

The lever 46 employed as a part of switch 28 is loosely mounted at its other end about a holdfast means 50 which connects base member or plate 31 with the leg 6. The levers 46 employed as parts of switches 29, 30 are pivotally connected at their other ends to the legs 14, 15 respectively.

Associated with the spring controlled bridging elements of the switches 28, 29 and 30 are combined impacting and compressing elements or devices 51, 52 and 53 respectively which function to shift said elements in a direction to open the current carrying circuit. The element 51 is operated from the shock of impact between the vehicle and an obstruction. The elements 52, 53 are operated when the vehicle upsets or overturns sidewise. The elements 51, 52 and 53 are normally locked in an inactive position.

The element 51 consists of a shank 54 pivoted at its lower end between the lugs 8, as at 55. The upper end of shank 54 is formed integral with the bottom of a weight 56 having its rear side inclined, as at 57. The element 51 when operating swings forwardly in a downward direction to engage the abutment piece 44 of the bridging element 41 of the switch 28 for the purpose of shifting element 41 in a direction to have the contacts 39, 40 move from electrical engagement with the heads 37, 38 respectively. Attached to the shank 54 as at 58 is the upper end of a pulling spring 59. The lower end of the latter is fixed to base 1, as at 60. The normal position of element 51 is as shown in Figure 1 and which is that it is held slightly rearwardly off dead center by the spring 59 and against plate 2. In case of sudden or violent impact, the momentum of the weight 56 swings element 51 forward past dead center and the pull from spring 59 and gravity will cause the weight 56 to impact and compress the element 41 of switch 28 from its normal position resulting in the opening of the circuit. The element 41 of switch 28 is arranged in the path of element 51 when the latter is operated, and when element 41 of switch 28 is shifted from circuit closing position, it is shifted to circuit opening position and held in such position by the lockout lever.

The elements 52, 53 are normally vertically disposed and are normally held in such position by a pair of releasing pendulums 61, 62 respectively. The elements 52, 53 are loosely suspended from their upper ends from a pair of spaced parallel short shafts 63, 64 respectively secured to the plates 2, 3 adjacent each side of the vertical medians of the latter and extended rearwardly from plate 3. The elements 52, 53 are mounted and retained on the extended ends of the shafts 63, 64 respectively. The elements 52, 53 are of pendulum-like form and consist of shanks 65, 66 respectively terminating at their lower ends into and centrally of the top of octagonal-shaped weights 67, 68 respectively formed centrally of their lower edges with semi-circular cutouts 69, 70 respectively. The weights 67, 68 have interposed therebetween the stop 27 for limiting the movement of said weights towards each other. The bottom edges of the weights 67, 68 are arranged above the bottom of the openings 19, 20 respectively. The lower portions of the weights 67, 68 when the elements 52, 53 are disposed normally, extend across the upper portions of the openings 19, 20 respectively and the edges of cutouts 69, 70 are arranged directly over the parts 23 of the corner walls 21, 22 of said openings. The weights 67, 68 have the side faces 67', 68' thereof constituting impact surfaces.

Arranged below the elements 52, 53 are the releasing pendulums 61, 62 respectively. These latter are disposed between the vertical medians and side edges of plates 2, 3. The pendulums 61, 62 are positioned between the plates 2, 3 and consist of stems 73, 74 respectively terminating at their lower ends into the tops of circular weights 75, 76 respectively. The stems 73, 74 of the pendulums 61, 62 respectively are loosely mounted intermediate their ends upon pivots 77, 78 supported by the plates 2, 3 in proximity to the corner walls 21, 22 respectively. Carried by the stems 73, 74 respectively are rearwardly extending releasing lugs 79, 80 respectively which project through the openings 19, 20 respectively and ride against the corner walls 21, 22 respectively and the edges of the cutouts 69, 70 respectively. The normal position of the lugs 79, 80 is against the center of the edges of the cutouts 69, 70 respectively and against the parts 23 of the corner walls 21, 22 respectively.

The bridging elements of the switches 29, 30 are arranged in the path of the side faces 67', 68' respectively of the weights 67, 68 respectively. The lugs 79, 80 coact with the parts 23 of the corner walls 21, 22 respectively to arrest movement of the pendulums 61, 62 respectively toward each other and whereby the pendulums can only swing one way, that is away from each other.

In connection with the operation of the mechanism on the upsetting of the automotive vehicle from right to left with respect to the showing, there is utilized the centripedal force created by a circular movement and the gravitational pull on the element 52 and pendulum 61 which are held in position by the lug 79 fitting in the cutout 69. The pendulum 61 is free to swing more than 90° in a direction away from corner wall 21 before lug 79 slips out of cutout 69. When lug 79 is moved from cutout 69, the element 52 is released and it swings downwardly whereby its said face 67' impacts with and compresses the bridging element 41 of the switch 29 thereby opening the circuit, and at which time lockout lever 46 functions to lock the bridging element 41 in circuit opening position.

In connection with the operation of the mechanism on the upsetting of the automotive vehicle from left to right with respect to the showing, the element 53, pendulum 62, lug 80, cutout 70 and face 68' of element 53 will function similar to that as referred to in the preceding paragraph to impact and compress bridging element 41 of the switch 30 whereby the circuit will be opened and element 41 locked in circuit opening position.

Figure 6:
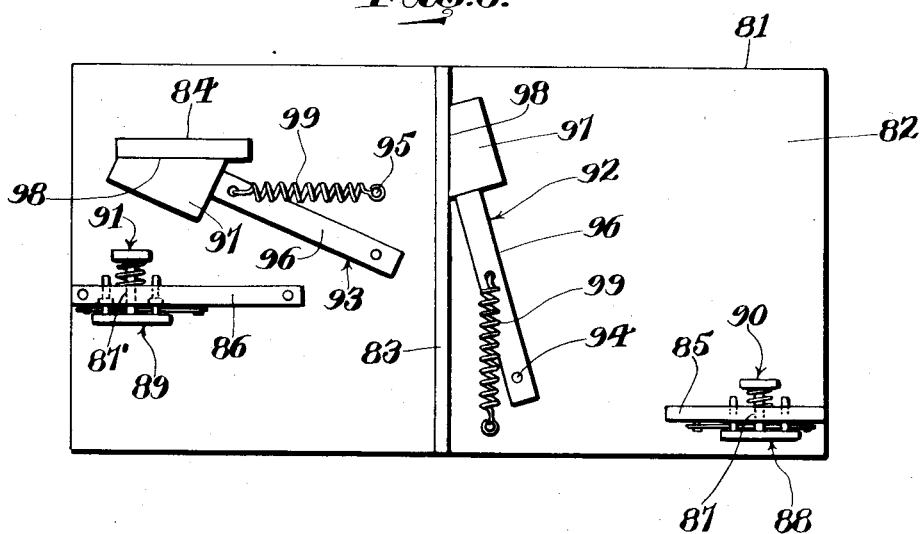
Figure 6 is an elevation of the form of current shut-off mechanism employed for aeroplanes.

Referring to Figure 6 which illustrates a form of a current cut-off mechanism in accordance with this invention, for use in connection with an aeroplane, the mechanism is so constructed and arranged to provide for the cutting off of the current when the aeroplane crashes vertically or horizontally. The mechanism as shown in Figure 6 includes a vertical support 81 in the form of a rectangular plate standing on one of its lower lengthwise edges and which has secured to its front face 82 thereof and at its vertical median with a vertically disposed strip 83 constituting a back stop for a purpose to be referred to. Secured against face 82 rearwardly of strip 83 and above the longitudinal median thereof is a strip 84 disposed lengthwise of the plate 81 and constituting a back stop for a purpose to be referred to. Secured to the face 82 of plate 81 in proximity to the bottom of said face 82 and at the forward portion of plate 81 is a plate 85 of insulation material which is disposed at right angles to face 82. Secured to the latter below and in spaced relation to strip 84 is a plate 86 of insulation material which is disposed at right angles to face 82. The plates 85, 86 have vertical openings 87, 87' respectively. The plates 85, 86 provide the base members of switches 88, 89 respectively of the same structural arrangement as the switches hereinbefore referred to. The switches 88, 89 include spring controlled compressible bridging elements 90, 91 respectively.

Pivotally connected to the plate or support 81 at spaced points are spring controlled shiftable combined impacting and compressing elements 92, 93. The latter is substantially horizontally disposed but positioned off of dead center and normally bears against strip 84. The element 92 is upstanding, inclines towards and abuts strip 83 and is normally disposed off center. The pivots for elements 92, 93 are indicated at 94, 95. Each of said elements 92, 93 includes a shank 96 pivoted in proximity to one end and having its other end terminate in a weight 97 having an inclined side 98. Attached to the shank 96 is one end of a pulling spring 99. The other end of spring 99 is anchored to support 81. The element 90 is arranged in the path of the weight of element 92. The element 91 is arranged in the path of the weight of the element 93. The elements 92, 93 operate in a manner similar to the element 51 referred to on vertical and horizontal crashes respectively. The element 92 will function to impact and compress bridging element 90 of switch 88 in a horizontal crash of the aeroplane. The element 93 will function to impact and compress bridging element 91 of switch 89 on a vertical crash of the aeroplane. The switches 88, 89 have lockout levers similar to and functioning in the same manner as the lockout lever of the switches 28, 29, 30. The strips 83, 84 limit the off center shift of the elements 92, 93 by the pulling springs 99 when said elements are in normal position.

What I claim is:—

1. A current shut-off mechanism comprising a switching means including a normally active bodily slidable spring controlled compressible bridging element for normally closing a circuit, a normally inactive pivoted weighted combined impacting and compressing element automatically movable on the application of shock thereto in a direction to impact and compress said bridging element for moving the latter to inactive position to open the circuit, and said switching means including a spring controlled pivot lockout lever automatically acting on the compressing of the bridging element to maintain the latter in circuit opening position, the pivot for said impacting and compressing element being disposed at right angles to the path of travel of the bridging element, and the pivot for said lever being disposed parallel to the path of travel of the bridging element.

2. In a current shut-off mechanism, an upstanding support, a vertically disposed normally inactive latched weighted pendulum element for shifting, when active, a circuit closing means to circuit opening position, said element being on one side of and pivotally suspended at its upper end from said support and made active on the shifting of said support, and a vertically disposed normally inactive weighted releasing pendulum member for the said element, said member being on the other side of and pivotally suspended at its upper end from said support and made active on the shifting of said support to release said element, said support element and member having coacting interengaging parts for normally latching said element in inactive position, the coacting part of said member extending through the coacting part of said support and engaging in the coacting part of said element.

3. In a current shut-off mechanism, an upstanding support, a vertically disposed normally inactive latched weighted pendulum element for shifting, when active, a circuit closing means to circuit opening position, said element being on one side of and pivotally suspended at its upper end from said support and made active on the shifting of said support, and a vertically disposed normally inactive weighted releasing pendulum member for the said element, said member being on the other side of and pivotally suspended at its upper end from said support and made active on the shifting of said support to release said element, said support element and member having coacting interengaging parts for normally latching said element in inactive position, and said element having its lower portion of polygonal contour.

4. The invention, as set forth in claim 2, having the coacting interengaging part of said member in the form of a lateral pin positioned above the pivot for said member, the coacting interengaging part of said support being in the form of an opening through which permanently extends said pin and the coacting part of said element being in the form of a curved cutout at the bottom of said element and with the pin permanently riding against said cutout.

5. The invention, as set forth in claim 2, having the major portion of said pendulum member arranged below said pendulum element.

6. The invention, as set forth in claim 2, having the interengaging coacting part of said member arranged above the pivot for the latter.

7. In combination, an upstanding support, a normally closed circuit closer at each end of said support, a pair of spaced sidewise opposed vertically disposed normally inactive weighted normally latched pendulum elements movable when released away from each other for shifting said closers to and holding them in open position, said elements being on one side of said support and pivotally suspended at their upper ends from said side of said support and made active when said support is shifted, a pair of spaced sidewise opposed vertically disposed normally inactive weighted releasing pendulum members for the said elements, said members being on the other side of and pivotally suspended near their upper ends from such side of said support and movable, when active, away from each other to release said elements, said support, elements and members having coacting interengaging parts for normally latching said elements in inactive position, and a stop on said support common to the lower portion of said elements for limiting the movement of said elements towards each other.

8. In combination, a supporting structure including a base and an upstanding portion adjacent the ends of the base, a normally closed circuit closer at each side of said portion, a normally closed circuit closer upon said base and spaced from said portion, a series of normally latched inactive pendulum devices, movable when released, in different directions for shifting said closers to and holding them in open position, said devices corresponding in number to the number of said closers, said devices being automatically releasable on the shifting of said structure in different directions to contact with and shift the closures to open position, and said portion being common to said devices for limiting the return movement of said devices to inactive position.

9. In combination, an upstanding support, a normally closed circuit closer at each end of said support, a pair of spaced sidewise opposed vertically disposed normally inactive weighted normally latched pendulum elements movable when released away from each other for shifting said closers to and holding them in open position, said elements being on one side of said support and pivotally suspended at their upper ends from said side of said support and made active when said support is shifted, a pair of spaced sidewise opposed vertically disposed normally inactive weighted releasing pendulum members for the said elements, said members being on the other side of and pivotally suspended near their upper ends from such side of said support and movable, when active, away from each other to release said elements, said support, elements and members having coacting interengaging parts for normally latching said elements in inactive position, a stop on said support common to the lower portion of said elements for limiting the movement of said elements towards each other, said elements having the lower portions thereof of polygonal contour, said members having the lower portions of circular contour, and said members being of less length than said elements.

10. In a current shut-off mechanism, an upstanding support, a vertically disposed normally inactive latched weighted pendulum element for shifting, when active, a circuit closing means to circuit opening position, said element being on one side of and pivotally suspended at its upper end from said support and made active on the shifting of said support, and a vertically disposed normally inactive weighted releasing pendulum member for the said element, said member being on the other side of and pivotally suspended at its upper end from said support and made active on the shifting of said support to release said element, said support, element and member having coacting interengaging parts for normally latching said element in inactive position, the coacting part of said member extending through the coacting part of said support and engaging in the coacting part of said element, said element being of greater length than said member and having its lower portion of polygonal contour, and said member having its lower portion of circular contour.

FRANK F. ADAMS.